United States Patent
Todd et al.

(10) Patent No.: US 11,734,248 B2
(45) Date of Patent: Aug. 22, 2023

(54) METADATA ROUTING IN A DISTRIBUTED SYSTEM

(71) Applicant: HITACHI VANTARA LLC, Santa Clara, CA (US)

(72) Inventors: Andrew Todd, Cambridge, MA (US); Walter Wohler, Longmont, CO (US)

(73) Assignee: HITACHI VANTARA LLC, Santa Clara, CA (US)

(*) Notice: Subject to any disclaimer, the term of this patent is extended or adjusted under 35 U.S.C. 154(b) by 109 days.

(21) Appl. No.: 17/420,153

(22) PCT Filed: Mar. 4, 2019

(86) PCT No.: PCT/US2019/020502
§ 371 (c)(1),
(2) Date: Jul. 1, 2021

(87) PCT Pub. No.: WO2020/180291
PCT Pub. Date: Sep. 10, 2020

(65) Prior Publication Data
US 2022/0083527 A1    Mar. 17, 2022

(51) Int. Cl.
*G06F 16/22* (2019.01)
*G06F 16/27* (2019.01)
*G06F 16/2455* (2019.01)

(52) U.S. Cl.
CPC .... *G06F 16/2282* (2019.01); *G06F 16/24557* (2019.01); *G06F 16/27* (2019.01)

(58) Field of Classification Search
CPC .................................................. G06F 16/2282

(Continued)

(56) References Cited

U.S. PATENT DOCUMENTS 9,274,710 B1 * 3/2016 Oikarinen ............... G06F 13/18
10,545,667 B1 * 1/2020 Magerramov ........ G06F 3/0607

(Continued)

FOREIGN PATENT DOCUMENTS

| EP | 0899667 B1 | 6/2009 |
| JP | 2018-49644 A | 3/2018 |
| WO | 2004/055675 A1 | 7/2004 |

OTHER PUBLICATIONS

Japanese Office Action received in corresponding Japanese Application No. 2021-549412 dated Oct. 11, 2022.

(Continued)

*Primary Examiner* — Muluemebet Gurmu
(74) *Attorney, Agent, or Firm* — Mattingly & Malur, PC

(57) ABSTRACT

In some examples, a first computing device may receive, from a second computing device, partition mapping information indicating partitions of a metadata database. The first computing device may be able to communicate with a plurality of metadata nodes, each metadata node maintaining a portion of the metadata database based on the partitioning of the metadata database to distribute the metadata database across the plurality of metadata nodes. The first computing device may determine to send a request to the metadata database based at least on key information. The first computing device may determine, based on the partition mapping information, a first metadata node of the plurality of metadata nodes indicated to maintain a partition of the metadata database corresponding to the key information. The first computing device, may send, to the first metadata node, based on the partition mapping information, a request to perform a database operation.

20 Claims, 11 Drawing Sheets

(58) Field of Classification Search
USPC .......................................................... 707/769
See application file for complete search history.

(56) References Cited

U.S. PATENT DOCUMENTS

| | | | | |
|---|---|---|---|---|
| 2011/0179008 A1* | 7/2011 | Talius | ................... | G06F 16/217 |
| | | | | 707/E17.108 |
| 2013/0166556 A1* | 6/2013 | Baeumges | ............ | G06F 16/182 |
| | | | | 707/E17.089 |
| 2015/0058298 A1* | 2/2015 | Earl | .................... | G06F 11/1484 |
| | | | | 707/674 |
| 2017/0139910 A1* | 5/2017 | Mcalister | ............ | G06F 16/1727 |
| 2018/0260146 A1* | 9/2018 | Zhou | ................... | G06F 11/1451 |
| 2018/0260149 A1 | 9/2018 | Zhou et al. | | |
| 2020/0236171 A1* | 7/2020 | Gupta | .................... | G06F 16/27 |

OTHER PUBLICATIONS

International Search Report and Written Opinion of the International Searching Authority of PCT/US2019/020502 dated May 28, 2019.

* cited by examiner

| KEY | VALUE |
|-----|-------|
| a1 | va1 |
| ... | ... |
| dn | vdn |
| e1 | ve1 |
| ... | ... |
| nn | vnn |
| o1 | vo1 |
| ... | ... |
| zn | vzn |

- 408 KEY
- 410 VALUE
- 402 FIRST PARTITION – KEYS a-e
- 404 SECOND PARTITION – KEYS e-o
- 406 THIRD PARTITION – KEYS o-z
- 400

FIG. 4

| Partition ID | Key-Space-Ranges | Leader ID | Node IDs |
|---|---|---|---|
| 1 | Key-Space1 a-d | host1 | host1, host2, host4 |
| 2 | Key-Space1 d-p | host3 | host1, host3, host4 |
| 3 | Key-Space1 p-z | host2 | host1, host2, host3 |

FIG. 6

METADATA ROUTING IN A DISTRIBUTED SYSTEM

TECHNICAL FIELD

This disclosure relates to the technical field of data storage.

BACKGROUND

Multi-partitioned databases may provide scalability by dividing metadata services amongst multiple computing devices, also referred to as "nodes". For example, high-availability and fault tolerance of metadata may be provided by replicating the metadata across multiple nodes. However, a client seeking to access the metadata may have difficulty determining which node is responsible for the metadata the client is trying to locate. In some cases, this may result in an excessive number of network requests for discovering the correct node to access, which may cause network congestion, limit system scalability, affect the flexibility of system reconfiguration, and so forth.

SUMMARY

Some implementations include a first computing device able to communicate with a plurality of metadata nodes, each metadata node maintaining a portion of a metadata database based on partitioning of the metadata database to distribute the metadata database across the plurality of metadata nodes. In some examples, the first computing device may receive, from a second computing device, partition mapping information indicating the partitions of the metadata database. The first computing device may determine to send a request to the metadata database based at least on key information. The first computing device may determine, based on the partition mapping information, a first metadata node of the plurality of metadata nodes indicated to maintain a partition of the metadata database corresponding to the key information. The first computing device, may send, to the first metadata node, based on the partition mapping information, a request to perform a database operation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 is a block diagram illustrating an example data structure according to some implementations.

FIG. 6 is a block diagram illustrating an example data structure for partition mapping according to some implementations.

DESCRIPTION OF THE EMBODIMENTS

Figure 1:
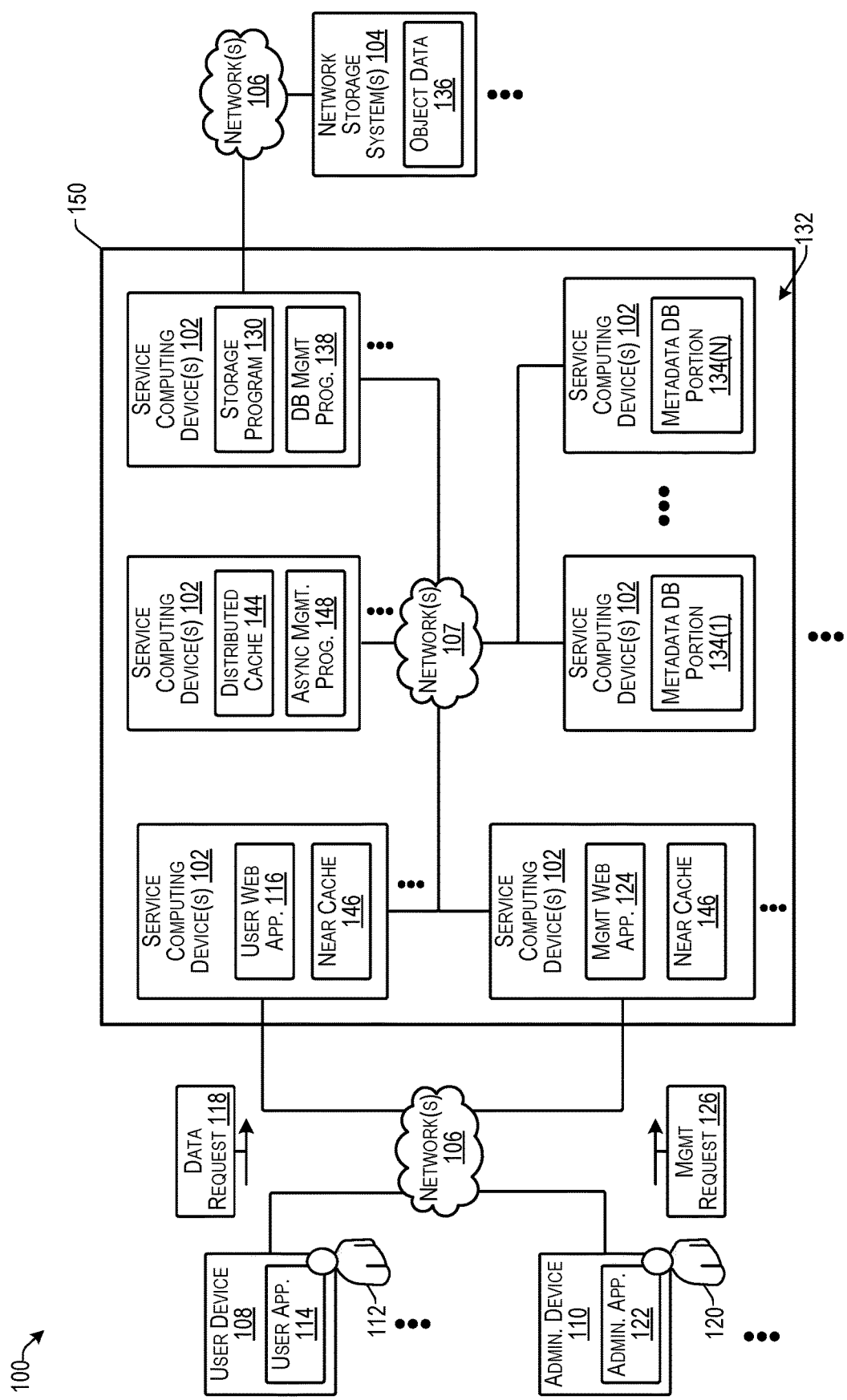
FIG. 1 illustrates an example architecture of a system able to store data and metadata according to some implementations.

Some implementations herein are directed to techniques and arrangements for a distributed computer system in which partition information is not stored in or controlled by a single component or table in the system. In some examples, as partitions come online, partition information such as key space and connection information may be provided to the client application. Further, client applications may have multiple fallback mechanisms for locating the correct node to contact, thereby preventing any single point of failure. Additionally, having client applications participating in partition information may allow for optimal routing of data requests.

Some examples herein include a system able to route requests for a highly-available scalable distributed metadata database. The metadata database herein may provide high-availability by maintaining strongly consistent copies of the metadata on separate metadata nodes. Further, the metadata database provides scalability by partitioning the metadata and distributing the metadata across distinct metadata nodes. Each partition may have a single metadata node that serves as the partition leader. The partition leader may be responsible for serving all requests for that specific partition. Further, the solution herein optimizes the ability for a client application to find the partition leader for a given request.

As mentioned above, the examples herein make the metadata highly available by storing strongly consistent copies of the metadata in a distributed configuration across multiple metadata nodes. In some cases, the consistency of the distributed metadata database is maintained using the Raft consensus algorithm. In the Raft algorithm, one node may be elected as a leader and may be responsible for servicing all read and write operations. The other nodes are follower nodes which receive copies of all transactions to enable them to update their own metadata database information. Should the leader node fail, one of the follower nodes may be elected as leader and may take over serving read and write transactions. Client nodes of the metadata system herein are able to discover which node is the Raft leader and direct requests to that node. If the leader of a partition should change, the clients are automatically routed to the new leader.

In some examples, each client may maintain a near-cache of partition information. Furthermore, the system may include a distributed cache that may publish updates to the distributed cache to the clients. Furthermore, the nodes herein may provide hints to clients indicating where data is located. Additionally, for maintaining efficiency, the number of distributed caches may be a small number compared to a total number of the nodes in the system. On the other hand, in some examples, a near cache may be included on each of the clients in the system to improve performance of the clients.

As one example, suppose that the system receives, from a user device, a user request for retrieving data. In this case, the user request may be first routed to near cache. During a steady state condition, the clients may typically have the correct answer in the near cache regarding which node is able to serve the user request. In this case, the client may achieve optimal efficiency by being able to make a direct communication to the correct node. For example, as a node takes responsibility for serving a partition of data, the node may inform the distributed caches of the new routing information for the data managed by that node. The distributed caches can then publish this information to the clients for storage in the respective near caches.

In some cases, the near cache of the client receiving the user request may have stale mapping. Accordingly, when the user request is routed to the node specified in the stale near cache, the client may receive a failure response from the node. The failure response may trigger a discovery process and may further include a hint regarding which node to check next for responding to the user request. If failure continues for a threshold number of tries, the client may fall back to querying each node individually. The performance resulting from polling all nodes may be extremely poor, but allows the client to determine the correct node and fulfil the user request in a worst case scenario. Thus, implementations herein provide a system with a distributed metadata database that is dynamically expandable and contractible, such as by enabling partitions to added and removed dynamically as data grows or shrinks. The system may include a set of tiered caches that cache system metadata, and uses a reactive cache update mechanism for efficiency in implementing a large geographically distributed database that is distribute across multiple physical and/or logical nodes.

For discussion purposes, some example implementations are described in the environment of one or more service computing devices in communication with a cloud storage system for managing storage of data using a distributed metadata database. However, implementations herein are not limited to the particular examples provided, and may be extended to other types of computing system architectures, other types of storage environments, other types of client configurations, other types of data, and so forth, as will be apparent to those of skill in the art in light of the disclosure herein.

FIG. 1 illustrates an example architecture of a system 100 able to store data and metadata according to some implementations. The system 100 includes a plurality of service computing devices 102 that are able to communicate with, or otherwise coupled to, at least one network storage system (s) 104, such as through one or more networks 106. Further, the service computing devices 102 are able to communicate over the network(s) 106 with one or more user computing devices 108 and one or more administrator devices 110, which may be any of various types of computing devices, as discussed additionally below.

In some examples, the service computing devices 102 may include one or more servers that may be embodied in any number of ways. For instance, the programs, other functional components, and at least a portion of data storage of the service computing devices 102 may be implemented on at least one server, such as in a cluster of servers, a server farm, a data center, a cloud-hosted computing service, and so forth, although other computer architectures may additionally or alternatively be used. Additional details of the service computing devices 102 are discussed below with respect to FIG. 11.

The service computing devices 102 may be configured to provide storage and data management services to users 112. As several non-limiting examples, the users 112 may include users performing functions for businesses, enterprises, organizations, governmental entities, academic entities, or the like, and which may include storage of very large quantities of data in some examples. Nevertheless, implementations herein are not limited to any particular use or application for the system 100 and the other systems and arrangements described herein.

The network storage system(s) 104 may be referred to as "cloud storage" or "cloud-based storage" in some examples, and may enable a lower cost storage solution per megabyte/gigabyte than local storage that may be available at the service computing devices 102 in some cases. Furthermore, in some examples, the network storage system(s) 104 may include commercially available cloud storage as is known in the art, while in other examples, the network storage system(s) 104 may include private or enterprise storage systems accessible only by an entity associated with the service computing devices 102, or combinations thereof.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing devices 102, the network storage system(s) 104, the user devices 108, and the administrative devices 110 are able to communicate over the one or more networks 106 using wired or wireless connections, and combinations thereof.

In addition, the service computing devices 102 may be able to communicate with each other over one or more networks 107. In some cases, the one or more networks 107 may be a LAN, private network, or the like, while other cases, the one or more networks 107 may include any of the networks 106 discussed above.

Each user device 108 may be any suitable type of computing device such as a desktop, laptop, tablet computing device, mobile device, smart phone, wearable device, terminal, and/or any other type of computing device able to send data over a network. Users 112 may be associated with user devices 108 such as through a respective user account, user login credentials, or the like. Furthermore, the user devices 108 may be able to communicate with the service computing device(s) 102 through the one or more networks 106, through separate networks, or through any other suitable type of communication connection. Numerous other variations will be apparent to those of skill in the art having the benefit of the disclosure herein.

Further, each user device 108 may include a respective instance of a user application 114 that may execute on the user device 108, such as for communicating with a user web application 116 executable on the service computing device(s) 102, such as for sending user data for storage on the network storage system(s) 104 and/or for receiving stored data from the network storage system(s) 104 through a data request 118 or the like. In some cases, the application 114 may include a browser or may operate through a browser, while in other cases, the application 114 may include any other type of application having communication functionality enabling communication with the user web application 116 over the one or more networks 106.

In the system 100, the users 112 may store data to, and receive data from, the service computing device(s) 102 that their respective user devices 108 are in communication with. Accordingly, the service computing devices 102 may provide local storage for the users 112 and respective user devices 108. During steady state operation there may be users 108 periodically communicating with the service computing devices 102.

In addition, the administrator device 110 may be any suitable type of computing device such as a desktop, laptop, tablet computing device, mobile device, smart phone, wearable device, terminal, and/or any other type of computing device able to send data over a network. Administrators 120 may be associated with administrator devices 110, such as through a respective administrator account, administrator login credentials, or the like. Furthermore, the administrator device 110 may be able to communicate with the service computing device(s) 102 through the one or more networks 106, through separate networks, or through any other suitable type of communication connection.

Further, each administrator device 110 may include a respective instance of an administrator application 122 that may execute on the administrator device 110, such as for communicating with a management web application 124 executable on the service computing device(s) 102, such as for sending management instructions for managing the system 100, as well as for sending management data for storage on the network storage system(s) 104 and/or for receiving stored management data from the network storage system(s) 104, such as through a management request 126 or the like. In some cases, the administrator application 122 may include a browser or may operate through a browser, while in other cases, the administrator application 122 may include any other type of application having communication functionality enabling communication with the management web application 124 over the one or more networks 106.

The service computing devices 102 may execute a storage program 130, which may provide a gateway to the network storage systems(s) 104, such as for sending data to be stored to the network storage systems(s) 104 and for retrieving requested data from the network storage systems(s) 104. In addition, the storage program 142 may manage the data stored by the system 100, such as for managing data retention periods, data protection levels, data replication, and so forth.

The service computing devices 102 may further include a metadata database (DB) 132, which may be divided into a plurality of metadata DB portions 134(1)-134(N) and which may be distributed across a plurality of the service computing devices 102. For example, the metadata DB 132 may be used for managing object data 136 stored at the network storage system(s) 104. The metadata DB 132 may include numerous metadata about the object data 136, such as information about individual objects, how to access the individual objects, storage protection levels for the objects, storage retention periods, object owner information, object size, object type, and so forth. Further, a DB management program 138 may manage and maintain the metadata DB 132 such as for updating the metadata DB 132 as new objects are stored, old objects are deleted, objects are migrated, and the like.

In addition, the service computing devices 102 may include a distributed cache 144 that may track the locations of the metadata DB portions 134, such as for tracking the particular service computing devices on which the metadata DB portions are stored, which partitions each portion is included in, and so forth. In some cases, the DB management program 138 may update the distributed cache as the metadata DB 132 is updated, migrated to different service computing devices 102, or the like.

Information in the distributed cache 144 may be used to update near caches 146 that may be maintained on certain ones of the service computing devices 146 that may execute applications that provide client services, such as the user web application 116 and the management web application 124. For example, the near cache may be periodically updated based on updates to the distributed cache 144. Accordingly, as one example, when the user web application 116 receives a data request 118 from a user device 108, the user web application may access the near cache 146 to determine with which service computing device 102 to communicate to access a desired metadata DB portion 134 for performing the data request 118. Accordingly, through the use of the near cache 146, the user web application is able to reduce the number of queries for obtaining desired information from the metadata DB 132 for performing the data request. Additional details of the distributed cache 144 and the near cache 146 are discussed below.

In addition, the service computing devices may include an asynchronous management program 148 that may be executed for performing updates to the metadata DB 132 and/or the object data 136. In some cases, the async management program 148 may be a module of the storage program 130, while in other cases, the async management program 148 may be a separate program. The async management program 148 may maintain an update queue or other data structure of data storage and management actions to be performed asynchronously in the system 100. For example, rather than having to perform certain storage operations and complete the operations before reporting back to a user, the async management program 148 may persist the required operations to the queue which may be configured to guarantee that the operations will be performed, and then can response to the user without a delay that may otherwise be included for some types of operations. The async management program 148 may then perform the operations in the update queue asynchronously as a background operation, or the like.

In some cases, the service computing devices 102 may be arranged into one or more groups, clusters, systems, or the like, at a site 150. In some cases a plurality of sites 150 may be geographically dispersed from each other such as for providing data replication, disaster recovery protection, or the like. Further, in some cases, the service computing devices 102 at a plurality of different sites 150 may be configured for securely communicating with each other, such as for providing a federation of a plurality of sites 150.

In some examples (not shown in FIG. 1) some of the service computing devices 102 may be arranged in pairs in which a first service computing device 102 may be coupled to a second service computing device 102 so that together they form a computing node for providing storage and data management services to a plurality of the user devices 108. For instance, a first service computing device 102 may act as a primary computing device, while a second service computing device 102 may act as a secondary computing device, such as for backup, failover, or the like. Further, as discussed additionally below, in some cases, a plurality of the service computing devices 102 may be configured in a Raft configuration for management of partitioned data, such as for providing redundancy of the metadata DB at multiple computing devices. Numerous other configurations will be apparent to those of skill in the art having the benefit of the disclosure herein.

Figure 2:
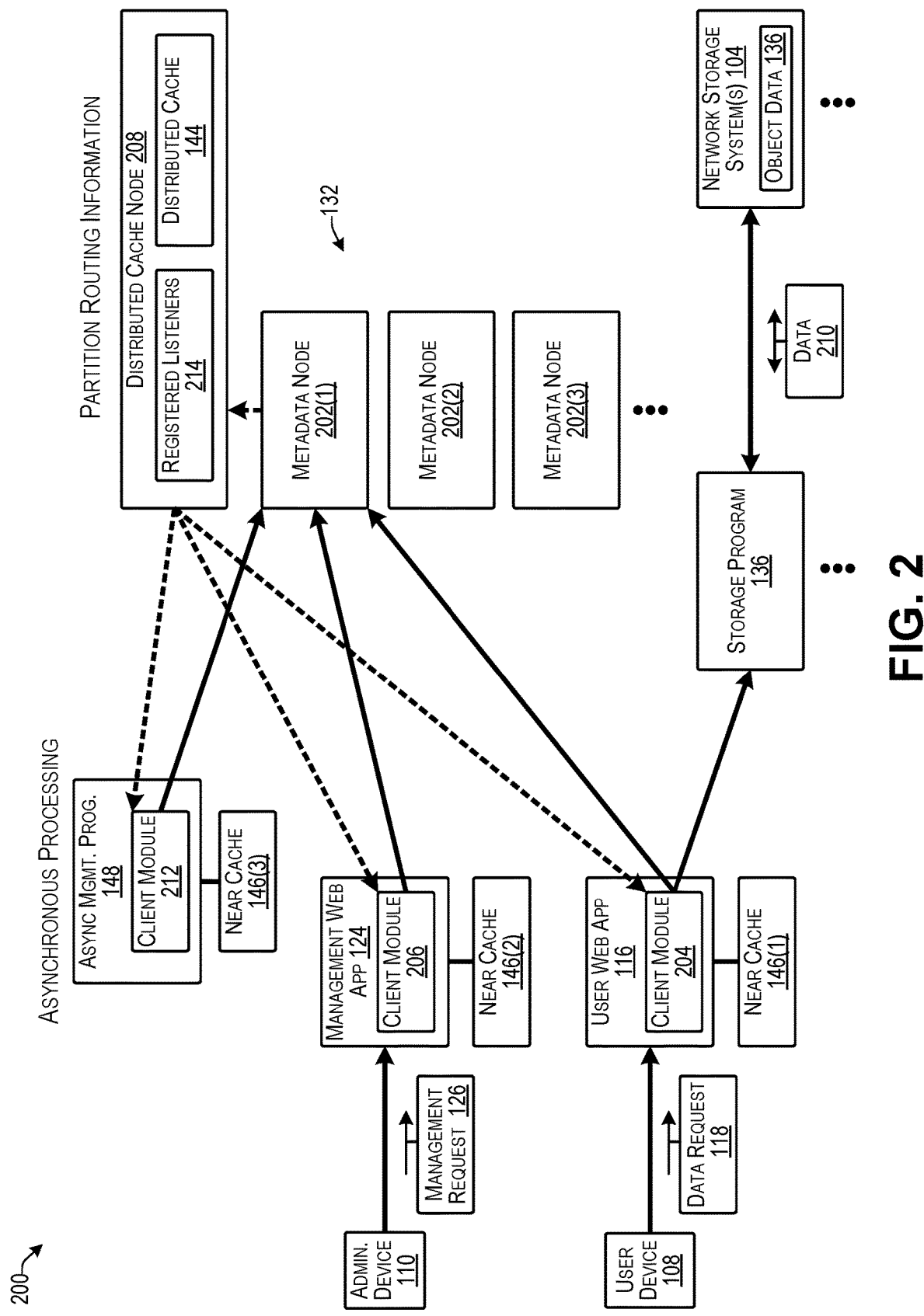
FIG. 2 is a block diagram illustrating an example logical configuration of a system according to some implementations.

FIG. 2 is a block diagram illustrating an example logical configuration of a system 200 according to some implementations. In some examples, the system 200 may correspond to the system 100 discussed above or any of various other possible computing system architectures, as will be apparent to those of skill in the art having the benefit of the disclosure herein. The system 200 may enable distributed object storage and may include the use of web applications as a front end for users and administrators. In some cases, the system 200 may store objects on the network storage in buckets that may be created by the users. The system 200 may enable complex management and storage of data using resources distributed across on-premises and cloud systems. In the system 200, scalability may be provided by logically partitioning the stored data that is stored across the geography. As discussed additionally below, the system 200 includes an efficient process for determining the location of desired metadata such as for responding to user or system requests.

Additionally, the system 200 may provide a distributed object store that employs a highly-available scalable and distributed metadata DB 132 to track metadata of objects or other data stored by the system 200, such as at the network storage system(s) 104. The system 200 includes a tiered cache to enable access to individual metadata nodes 202 of the metadata DB 132 for efficiently reading and writing the metadata that is stored in the metadata DB 132. In this example, the metadata DB 132 includes metadata nodes 202(1), 202(2), 202(3), . . . , each of which may include one or more of the service computing devices 102 maintaining a metadata DB portion 134, as discussed above with respect to FIG. 1.

The system 200 further includes the user web application 116, the management web application 124 that provide management and data access services and management services to the users and administrators, respectively. For example, the user web application 116 may include a client module 204 and the management web application 124 may include a client module 206, each of which is configured to interact with other nodes in the system 200. For instance, the client modules 204, 206 may interact with the metadata nodes 202 for retrieving metadata, may interact with a distributed cache node for receiving cache information to update an associated near cache 146(1) or 146(2), respectively, and may interact with the storage program 136, such as for retrieving data 210 based on retrieved metadata.

The system 200 may also include the async management program 148, that may also include a client module 212 that is able to communicate with the metadata nodes 202, the distributed cache node 208 and/or the storage program 136 when the async management program 148 is performing various asynchronous services, such as to process, maintain and react to data and metadata in the system. In some cases, the client 212 may be able to efficiently connect to and read from/write to the metadata database 132 based on accessing an associated near cache 146(3).

In addition, in some cases, the distributed cache node 208 may include registered listeners 214. As discussed additionally below, each near cache 146(1), 146(2), and 146(3) may have a registered listener 214 registered with the distributed cache node 208. When an update is made to the distributed cache 144, the associated registered listeners 214 may send information about the update to the respective near cache 146. Accordingly, the registered listeners enable the near caches 146 to be kept up to date, thereby reducing the number of incorrect calls to the metadata nodes by the client modules 204, 206, 212.

Figure 3:
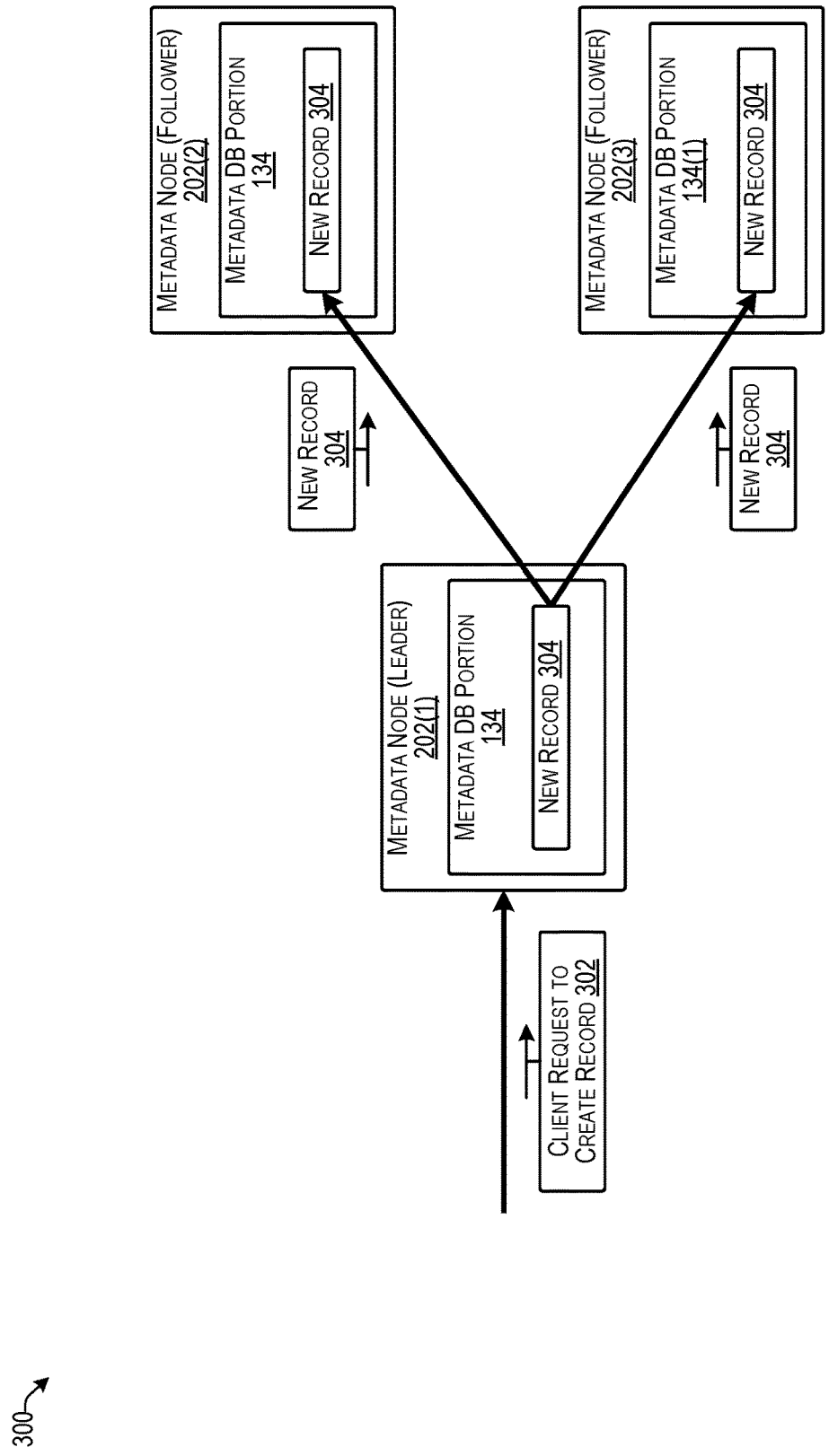
FIG. 3 is a block diagram illustrating an example configuration of a metadata node partition according to some implementations.

FIG. 3 is a block diagram illustrating an example configuration of a metadata node partition 300 according to some implementations. The metadata nodes 202 herein may be configured into a plurality of partitions 300, with each partition 300 being configured to operate according to the Raft consensus algorithm to provide redundant backups of the metadata DB portion 134 managed by the metadata nodes 202. For example, the Raft algorithm ensures that each metadata nodes 202 agrees upon the same change to the metadata DB portion 134. The Raft group achieves consensus via an elected leader, e.g., metadata node 202 in a Raft group may be either the leader or a follower. The leader may be responsible for replication of changes to the metadata DB portion 134 to the follower nodes. The leader may regularly inform the followers of its existence by sending a heartbeat message. If the leader does not send the heartbeat message within a threshold period of time, the followers may elect a new leader from among the followers. Thus, in this example, and the examples discussed below, each partition 300 has a single leader metadata node 202 referred to as the "partition leader" that is responsible for serving all requests for that specific partition. Accordingly, one problem solved by the implementations herein is optimally determining the correct partition leader to which to send a given request from a client.

In the illustrated example, the metadata node 202(1) is the partition leader of the partition 300, and the metadata nodes 202(2) and 202(3) are the followers. The metadata node 202(1), as the leader, receives a client request 302 to create a record. In response, the metadata node 202(1) creates a new record 304 in the metadata DB portion 134 managed by the metadata node 202(1). In addition, based on the Raft algorithm, the metadata node 202(2) replicates the new record 304 to the follower metadata nodes 202(2) and 202(3). Each of these metadata nodes 202(2) and 202(3) adds the new record 304 to the metadata DB portion 134 that it manages.

Further, in this example, it is worth noting that the "leader" and "follower" distinctions are with respect to the partition, and not the metadata nodes 202 themselves. For example the "leader" metadata node 202(1) in this example is the leader for this partition, but may also be a follower or leader for one or more other partitions that the metadata node 202(1) might also manage.

Accordingly, the configuration of FIG. 3 provides highly available metadata by making strongly consistent copies of the metadata on multiple metadata nodes 202. The distributed metadata DB herein achieves this using the established Raft protocol in which one or more follower nodes receive copies of all transactions. Should the leader node fail, one of the follower nodes may be elected as leader and take over serving read and write transactions. As discussed additionally below, clients of the metadata DB are typically able to discover which node is the Raft leader and make its requests to that node based referring to an associated near cache. If the partition leader should change, the distributed cache and the near cache are updated so that the clients may be routed to that new leader.

FIG. 4 is a block diagram illustrating an example data structure 400 according to some implementations. In this example, the data structure 400 includes key-value pairs that describe a plurality of partitions, such as a first partition 402, a second partition 404, and a third partition 406. The data structure 400 includes keys 408 and corresponding values 410.

Partitioning (also sometimes referred to as sharding) of the metadata in the metadata DB herein allows scaling of the metadata DB by dividing the responsibility of regions of metadata across distinct metadata nodes in the system. In this example, partitioning of the metadata DB is accomplished by dividing the key-space (i.e., the set of all possible keys 408) of each metadata table into key-space-ranges associated with a partition. Each partition is given a partition identifier and a set of key-space-ranges for which the node managing the DB partition is responsible.

In the illustrated example, the first partition 402 includes keys a to e; the second partition 404 includes keys e to o; and the third partition 406 includes keys o to z. Thus, the metadata DB portion managed by each set of metadata nodes may correspond to a respective partition determined using the above-described technique. Furthermore, the partitions may be periodically adjusted based on changes in the amount of data in each partition 402-406, such as for balancing the amount of data managed by each metadata node.

Figure 5:
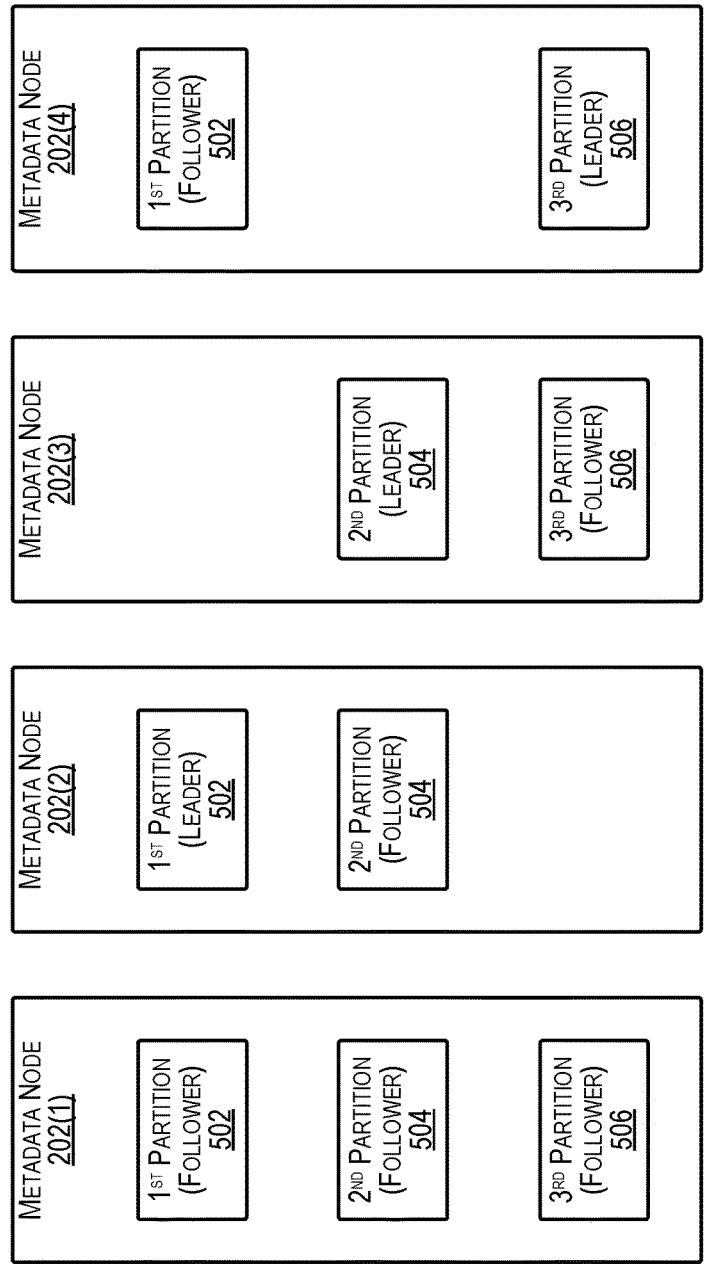
FIG. 5 is a block diagram illustrating an example configuration of a plurality of metadata nodes according to some implementations.

FIG. 5 is a block diagram illustrating an example configuration 500 of a plurality of metadata nodes 202 according to some implementations. In this example, a Raft group is formed for each of three partitions 502, 504 and 506 on a subset of metadata nodes 202(1)-202(4). The leader of that Raft group is the partition leader and is responsible for serving all requests to the other members of that partition. Each metadata node 202 may be a member of multiple Raft groups and hence multiple partitions. Any metadata node 202 can become the leader for any of the partitions that it manages. In this example, the metadata node 202(1) manages a first partition 502 as a follower, a second partition 504 as a follower, and a third partition 506 as a follower. The metadata node 202(2) manages the first partition 502 as the leader and the second partition 504 as a follower. The metadata node 202(3) manages the second partition 504 as the leader and the third partition 506 as a follower. The metadata node 202(4) manages the first partition as a follower and the third partition 506 as the leader.

Clients of the metadata system are able to discover which node is the partition leader for a given metadata DB access request, such as by referring to a near cache (not show in FIG. 5). If the partition leader should change, the clients may be routed to the new leader, such as based on updated information provide to the near cache, or through other techniques, as discussed additionally below.

Partitions may also be split and merged in some cases. Splitting a partition means dividing the key-space-ranges served by a single partition into two or more new partitions. Splitting a partition may occur when the amount of metadata included the partition has grown large and it is desirable to spread the metadata across a larger number of metadata nodes. On the other hand, merging of partitions may include joining the metadata of multiple partitions together into a single partition. The metadata that is merged into the single partition may have contiguous key-space-ranges to simplify the merging a subsequent partition accesses. Merging a partition may occur when a set of partitions has shrunk to an extent such that it is more efficient to serve the corresponding metadata in a single partition.

FIG. 6 is a block diagram illustrating an example data structure 600 for partition mapping according to some implementations. In this example, the data structure 600 includes a partition ID 602, key-space ranges 604 corresponding to the partition ID, a leader ID 606 for the leader of the partition, and node IDs 608 of the nodes that are members of the partition. As mentioned above, for a given request, a client may determine to which partition the request belongs. To do this, the client may map a key for the request to one of the key-space ranges 604. The client then may determine which partition is responsible for the key-space range 604 that contains that key. If the key-space ranges and/or the partitions change, the data structure may need to be updated to enable the client to find desired information such as in the case of a new partition, merged partition, or the like.

To communicate partition information between system components, the system herein may use partition map entries as illustrated in the data structure 600. Partition map entries describe sufficient information for the client to route a request to the partition leader. For example, the partition map entries relate the key-space-ranges to a system-unique identifier of the node that is the partition leader for each key-space range.

Figure 7:
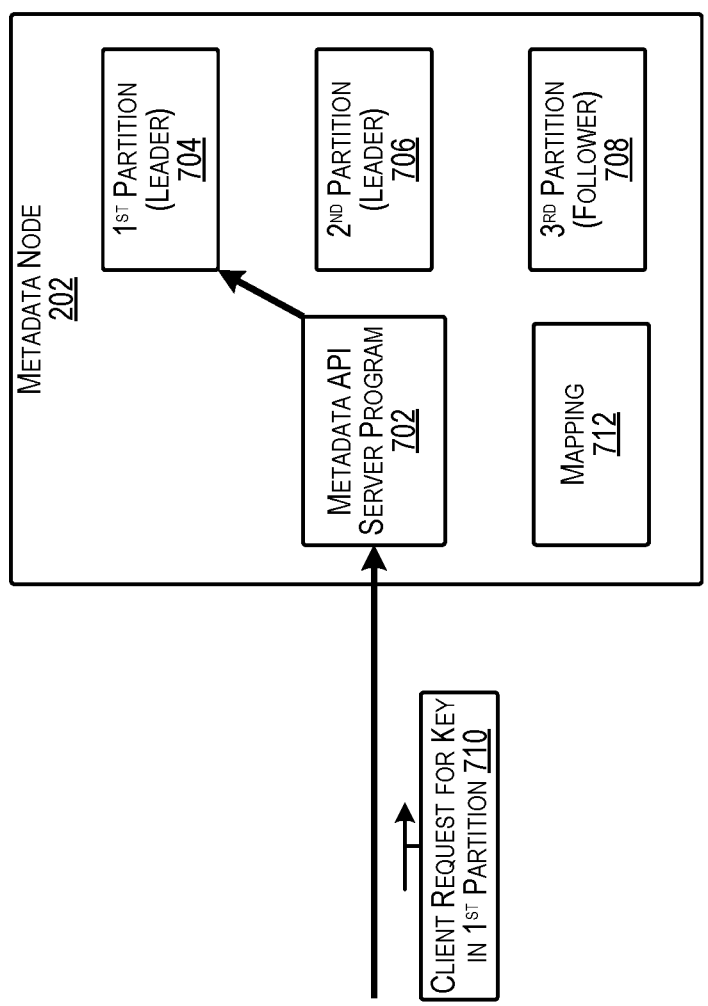
FIG. 7 is a block diagram illustrating an example configuration of a metadata node according to some implementations.

FIG. 7 is a block diagram illustrating an example configuration of a metadata node 202 according to some implementations. The metadata nodes 202 herein are the actual database nodes. The metadata nodes 202 may serve metadata requests, store metadata on persistent storage, such as magnetic disk, or the like, and may participate in Raft groups to provide consistent high-availability and durability of the metadata. Each metadata node 202 may be part of multiple separate Raft groups, with each Raft group representing a different partition. The metadata nodes 202 may be elected the leader of any Raft group of which they are a member, and at which point the elected leader will service requests for that partition.

In the illustrated example, the metadata node 202 includes a metadata application programming interface (API) server program 702. In addition, this metadata node 202 manages a first partition 704 as the leader, a second partition 706 as the leader, and a third partition 708 as a follower. The metadata node 202 may receive a client request 710 for a key in the first partition 704 via the metadata API server program. In response, the metadata API server program may access the first partition 704 to obtain the requested information from the associated metadata database portion, and may return the requested information to the client that sent the request 710.

Each metadata node 202 may maintain a partition mapping 712 between partition map entries and Raft groups. When the metadata node 202 receives a request from a client, the partition mapping 712 may be consulted to determine to which Raft group the request belongs. If the metadata node does not have a mapping for a particular request, an error may be returned to the requesting client. Otherwise, the request is forwarded to the correct Raft group. If the metadata node 202 is the leader of that Raft group, the request is serviced by the metadata node. Otherwise, such as in the case that the metadata node is a follower of that Raft group, an error is returned to the requesting client containing the connection information of the leader of Raft group. Accordingly, the requesting client is provided a hint in the returned error message as to which metadata node to redirect the request.

During partition membership events, such as if a metadata node is elected leader or if, as a leader, the Raft group membership changes (such as in the case of metadata node additions or removal), the metadata node 202 may submit a new partition map entry to two places. Firstly, the metadata node 202 may update the internal mapping 712 of partition map entries to Raft groups, allowing the metadata node 202 to be able to service requests for that partition. Secondly, the metadata node 202 may update a distributed cache of partition map entries so clients of the system can see the new routing information. To protect against failures of the distributed cache losing information, metadata node 202 may periodically retransmits its partition map entries to the cache.

Figure 8:
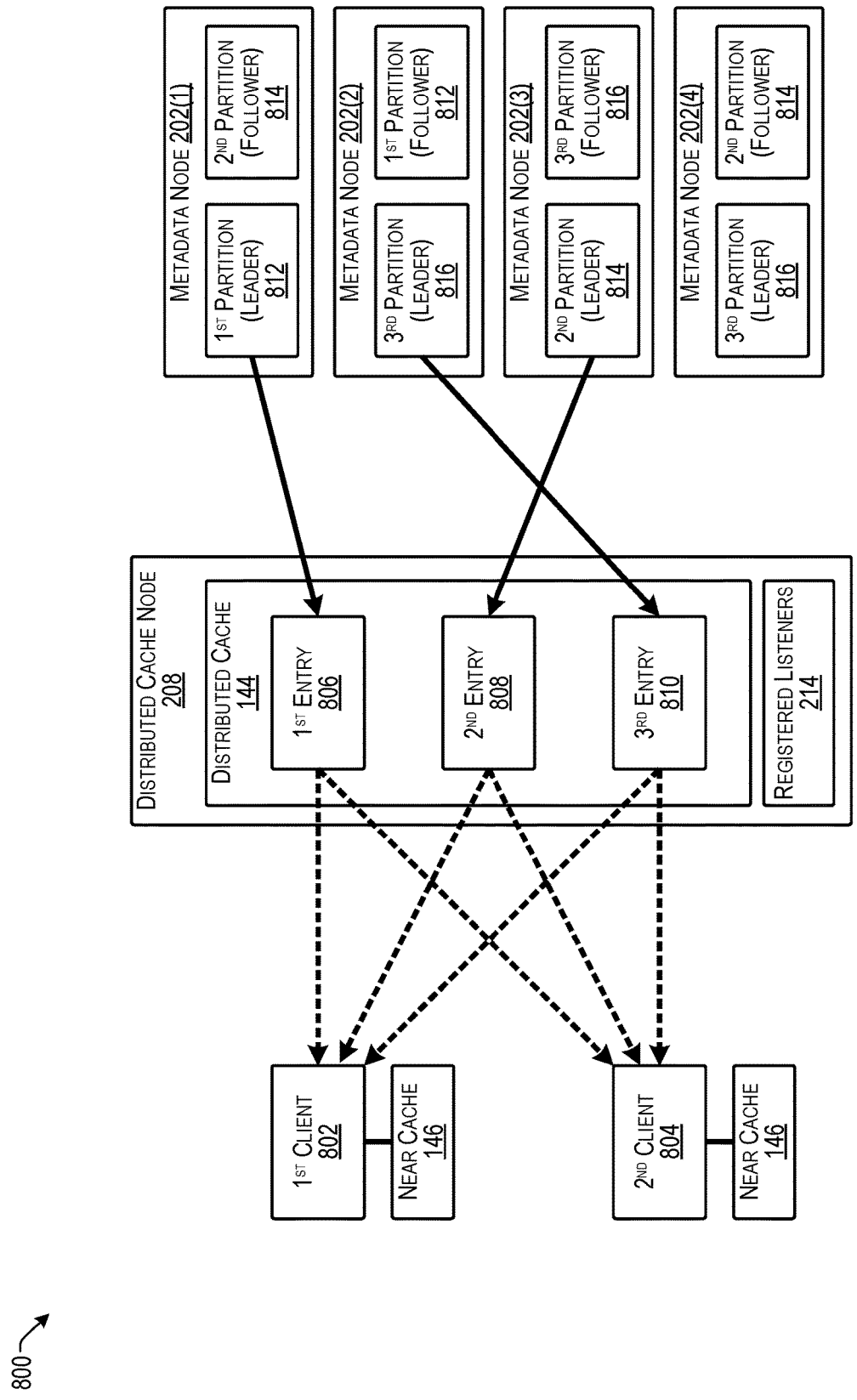
FIG. 8 is a block diagram illustrating an example configuration of a system according to some implementations.

FIG. 8 is a block diagram illustrating an example configuration of a system 800 according to some implementations. In some examples, the system 800 may correspond to the system 100 and/or the system 200 discussed above, as well as other system architectures. There are three main components the system 800, namely, the clients 802 and 804, the distributed cache 144, and the metadata nodes 202(1)-202(4).

The distributed cache 144 may be maintained on the distributed cache node 208, and may be used for storing and distributing partition map entries to the clients 802, 804 (which may correspond to any of the client modules 204, 206, 212 discussed above, or other client applications that may operate in the systems herein). In some examples, the distributed cache 144 may be ephemeral and/or in-memory only. The distributed cache 144 contains the set of partition map entries submitted from the metadata nodes 202 on partition membership events. A first entry 806, a second entry 808, and third entry 810 are illustrated in this example.

As discussed above with respect to FIG. 2, clients 802, 804, and other clients not shown in FIG. 8 may register listeners 214 that are used for updating corresponding near cache(s) when a change is made to the distributed cache 144. For example, when a partition map entry is submitted to the distributed cache 144, the distributed cache node will open a connection to each client with a registered listener 214 and send the client that update. In the event of complete failure, the distributed cache 144 may be rebuilt, e.g., on a different node, with the latest entries, which may be received as the metadata nodes 202 resend their current partition map entries.

The clients 802 and 804 may receive requests, e.g., from a user, and may send corresponding requests to the metadata database, may receive a response, and may returning the response to the requesting user. When a client starts, the client may first connect to the distributed cache 144 and read all existing partition map entries. The client may store this information as a near cache 146. In addition, the client may register a listener 214 to receive all new partition map entries.

In the illustrated example, the metadata nodes 202(1)-202(4) maintain three partitions, namely, a first partition 812, a second partition 814, and a third partition 816. The leader of the first partition 812 is on metadata node 202(2), the leader of the second partition 814 is on metadata node 202(3), and the leader of the third partition is on metadata node 202(2). Thus, as indicated by the solid black arrows between the partition leaders and the entries, only the leader of a partition group may update the corresponding entry at the distributed cache 144. Further, as indicated by the dashed arrows, updates to the entries 806-810 may be propagated to the clients 802 and 804 for updating the near cache 146.

Accordingly, only certain metadata is stored in the distributed cache 144, such as system metadata that includes partition maps. The number of distributed caches 144 in a distributed multisite computing system may be small number compared to the total number of nodes in the system. Near caches 146, on the other hand, may exist on every node in the system that has a client functionality, but may have stale data in some situations. User requests may typically be first routed to the near cache 146, which might result in a stale searched-data-to-partition-mapping. If the routed request receives a failure response from the node to which it was directed, this may trigger a discovery process in the sending client. For example, the discovery process may involve consulting one of the distributed caches 144, which may also result in an update of the client's near cache. The use of shared distributed caches and near caches of partition information may enable a typical client request to only require one network hop. The distributed cache 144 may be updated through notifications from metadata nodes 202 whenever the partition membership changes, and the near caches 146 may then be updated based on the registered listeners 214. In this way, all client near caches may be kept up to date with all partition changes following any updates at the centralized distributed cache 144. The distributed cache 144 can be distributed for high availability.

In the situation in which the near cache 146 is stale and the distributed cache 144 is unavailable, a client may resort to polling each individual metadata node 202 for completing a request. The system performance associated with polling all of the nodes 202 may be poor, but still allows a client to discover requests and cache the results itself. An example algorithm for discovery may include checking a client near-cache for a partition serving a desired metadata key. If a cache miss occurs, the client may check a distributed cache 144 partition serving the metadata key. If a cache miss or connection failure occurs, the service computing device may attempt to perform the request on each metadata node until a correct node is found.

Figure 9:
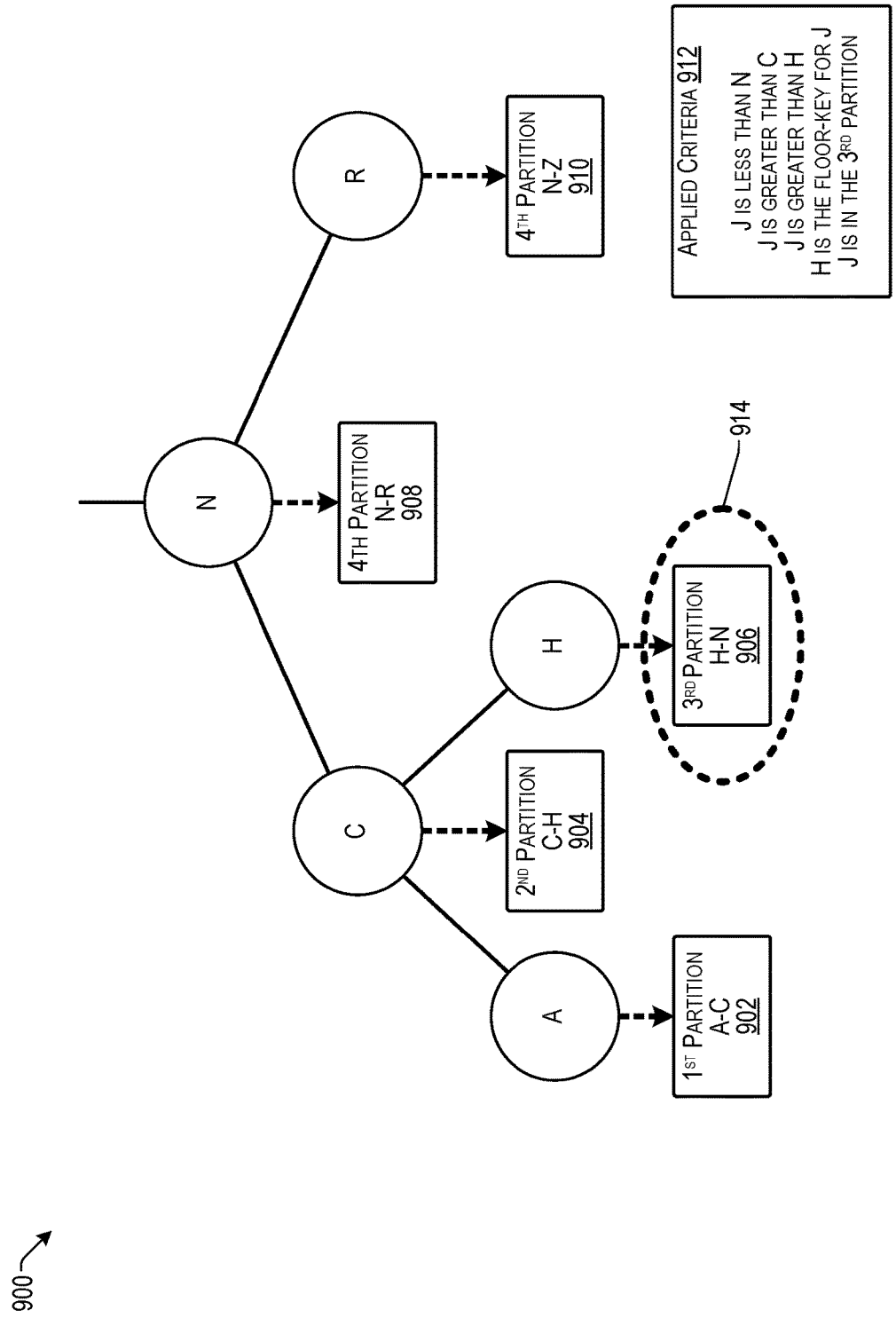
FIG. 9 is a block diagram illustrating an example configuration of a key-space-tree data structure according to some implementations.

FIG. 9 is a block diagram illustrating an example configuration of a key-space-tree data structure 900 according to some implementations. For every partition map entry received, a client may update two data structures. The first data structure (not shown in FIG. 9) may be a simple mapping of partition ID to partition map entry. The second data structure is a key-space-tree data structure 900 that maintains a mapping of key-space ID to key-space tree. The key-space tree may include a tree-based mapping from a lower bound of a key-space range to the partition ID for that key-space range. The key-space tree data structure 900 may thus be searched in efficient logarithmic time to find the correct partition ID for any given key.

In the example of FIG. 9, the key-space tree data structure 900 indicates the upper bound keys, e.g., A, C, H, N, and R for four partitions, namely a first partition 902, having keys A-C, a second partition 904 having keys C-H, a third partition 906 having keys H-N, and a fourth partition having keys N-Z. Note that, as indicated at FIG. 4, the ceiling letter is non-inclusive in these examples. In this example, suppose that the key is "J", then, as indicated at 912, the client may locate the correct partition based on J being less than N, J being greater than C, J being greater than H, H being the floor-key for J, and therefore, J is in the 3rd partition, as indicated at 914.

When a request comes from a user, a client may determine the key-space for the user request using provided mapping functions for that request type. Once the key-space is determined, a partition ID can be found from the associated key-space-tree data structure. The partition ID may then be used to find the partition map entry for that partition which identifies the metadata nodes in that partition's Raft group.

The client may then send a first request to the node identified as the leader in the partition map entry. In a typical steady state for the system herein, the partition mapping possessed by the client will be up to date and the request will be sent to the correct partition leader metadata node. If the metadata node contacted by the client is no longer the partition leader for that partition, the client may determine if a hint was provided with the response, e.g., indicating that another node is now the partition leader for the Raft group, as discussed above with respect to FIG. 7. If so, the client will send the request to the node indicated in the hint. If there is no hint, the client may proceed to first check all the nodes that it has an indication of being in the same Raft group. Should any of the other metadata nodes in the Raft group provide a hint as to which node is the leader, the client will prioritize checking the node it was hinted at. If the client exhausts all the Raft group nodes, the client may then proceed to poll all metadata nodes in the system. In the worst case, no metadata node is the leader for the partition and the client will return an error message which may be propagated to a user and/or administrator.

Figure 10:
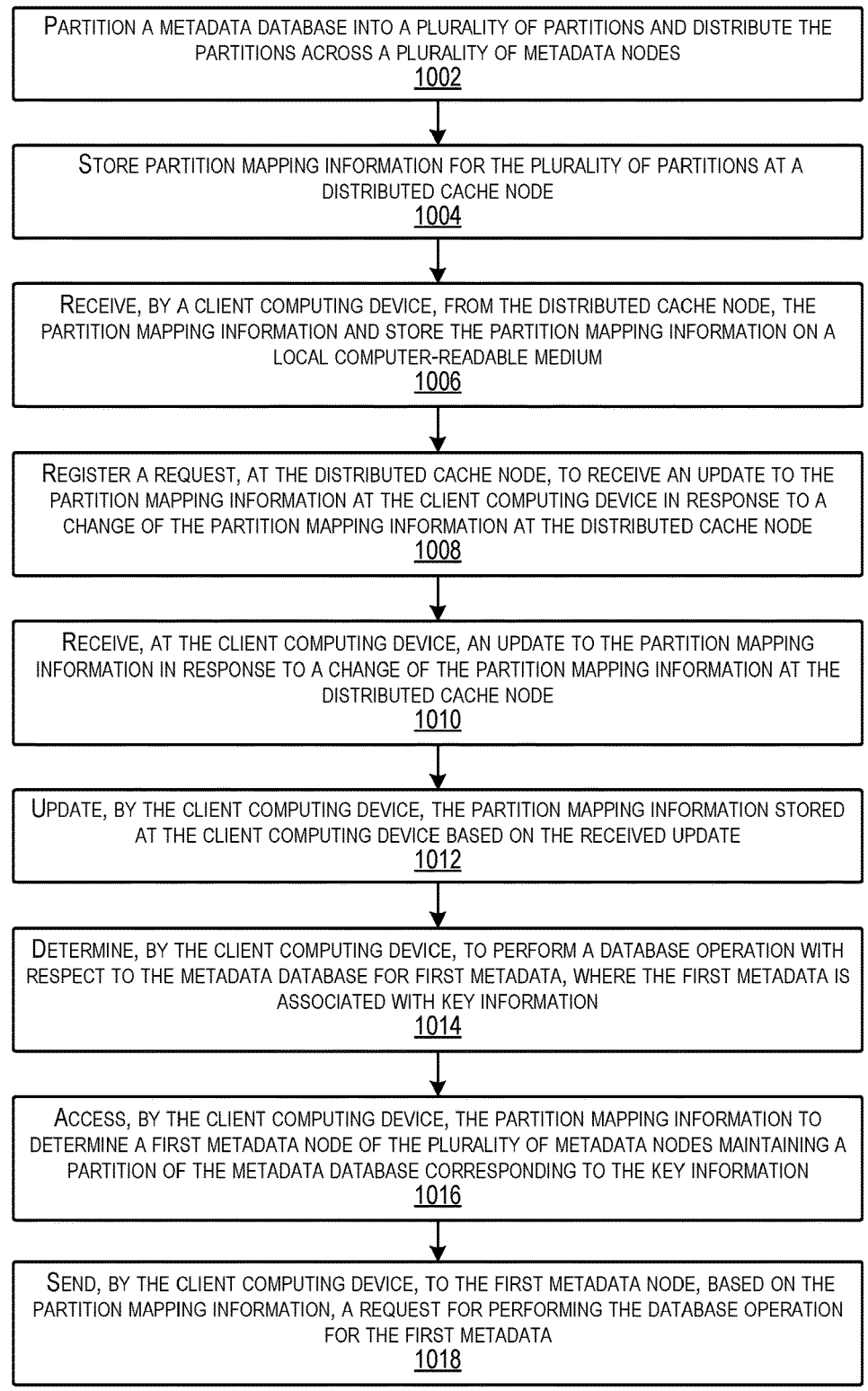
FIG. 10 is a flow diagram illustrating an example process for routing metadata requests according to some implementations.

FIG. 10 is a flow diagram illustrating an example process for routing metadata requests according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In FIG. 10, the process 1000 may be executed at least in part by the one or more service computing devices 102.

At 1002, a metadata database may be partitioned into a plurality of partitions and the partitions distributed across a plurality of metadata nodes.

At 1004, partition mapping information for the plurality of partitions may be stored at a distributed cache node.

At 1006, a client computing device, may receive, from the distributed cache node, the partition mapping information and may store the partition mapping information on a local computer-readable medium.

At 1008, the client computing device may register a request, at the distributed cache node, to receive an update to the partition mapping information at the client computing device in response to a change of the partition mapping information at the distributed cache node.

At 1010, the client computing device may receive an update to the partition mapping information in response to a change of the partition mapping information at the distributed cache node.

At 1012, the client computing device may update the partition mapping information stored at the client computing device based on the received update.

At 1014, the client computing device may determine to perform a database operation with respect to the metadata database for first metadata, where the first metadata is associated with key information.

At 1016, the client computing device may access the partition mapping information to determine a first metadata node of the plurality of metadata nodes maintaining a partition of the metadata database corresponding to the key information.

At 1018, the client computing device may send, to the first metadata node, based on the partition mapping information, a request for performing the database operation for the first metadata.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 11:
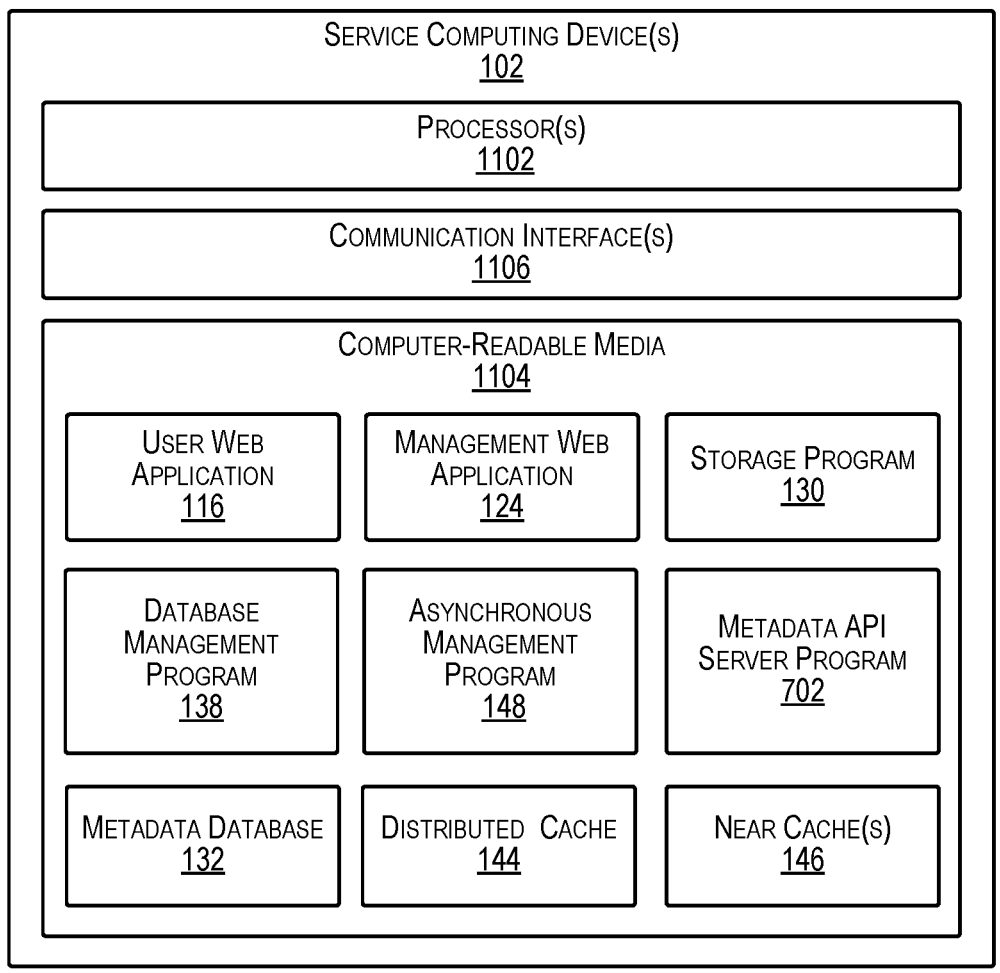
FIG. 11 illustrates select example components of the service computing devices that may be used to implement at least some of the functionality of the systems described herein.

FIG. 11 illustrates select example components of the service computing devices 102 that may be used to implement at least some of the functionality of the systems described herein. The service computing devices 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. Multiple service computing devices 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 1102, one or more computer-readable media 1104, and one or more communication interfaces 1106. Each processor 1102 may be a single processing unit or a number of processing units, and may include single or multiple computing units, or multiple processing cores. The processor(s) 1102 can be implemented as one or more central processing units, microprocessors, microcomputers, microcontrollers, digital signal processors, state machines, logic circuitries, and/or any devices that manipulate signals based on operational instructions. As one example, the processor(s) 1102 may include one or more hardware processors and/or logic circuits of any suitable type specifically programmed or configured to execute the algorithms and processes described herein. The processor(s) 1102 may be configured to fetch and execute computer-readable instructions stored in the computer-readable media 1104, which may program the processor(s) 1102 to perform the functions described herein.

The computer-readable media 1104 may include volatile and nonvolatile memory and/or removable and non-removable media implemented in any type of technology for storage of information, such as computer-readable instructions, data structures, program modules, or other data. For example, the computer-readable media 1104 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 1104 may be a tangible non-transitory medium to the extent that, when mentioned, non-transitory computer-readable media exclude media such as energy, carrier signals, electromagnetic waves, and/or signals per se. In some cases, the computer-readable media 1104 may be at the same location as the service computing device 102, while in other examples, the computer-readable media 1104 may be partially remote from the service computing device 102. For instance, in some cases, the computer-readable media 1104 may include a portion of storage in the network storage 120 discussed above with respect to FIG. 1.

The computer-readable media 1104 may be used to store any number of functional components that are executable by the processor(s) 1102. In many implementations, these functional components comprise instructions or programs that are executable by the processor(s) 1102 and that, when executed, specifically program the processor(s) 1102 to perform the actions attributed herein to the service computing device 102. Functional components stored in the computer-readable media 1104 may include the user web application 116, the management web application 124, the storage program 130, the database management program 138, the asynchronous management program 148, and the metadata API server program 702, each of which may include one or more computer programs, applications, executable code, or portions thereof. Further, while these programs are illustrated together in this example, during use, some or all of these programs may be executed on separate service computing devices 102.

In addition, the computer-readable media 1104 may store data, data structures, and other information used for performing the functions and services described herein. For example, the computer-readable media 1104 may store the metadata database 132, the distributed caches 144 and the near cache(s) 146. Further, while these data structures are illustrated together in this example, during use, some or all of these data structures may be stored on separate service computing devices 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 1106 may include one or more software and hardware components for enabling communication with various other devices, such as over the one or more network(s) 106. For example, the communication interface(s) 1106 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device able to communicate with a plurality of metadata nodes, each metadata node maintaining a portion of a metadata database based on partitioning of the metadata database to distribute the metadata database across the plurality of metadata nodes, the first computing device including one or more hardware processors configured by executable instructions to cause the first computing device to perform operations comprising:
receiving, by the first computing device, from a second computing device, partition mapping information indicating partitions of the metadata database;
determining, by the first computing device, to perform a database operation with respect to the metadata database for first metadata, wherein the first metadata is associated with key information;
accessing, by the first computing device, the partition mapping information to determine a first metadata node of the plurality of metadata nodes indicated to maintain a partition of the metadata database corresponding to the key information;
sending, by the first computing device, to the first metadata node, based on the partition mapping information, a request for performing the database operation for the first metadata, wherein:
partitioning of the metadata database to distribute the metadata database across the plurality of metadata nodes comprises assigning the first partition of the metadata database to a plurality of the metadata nodes;
the first metadata node is a leader node configured to respond to metadata database requests based on maintaining the first partition of the metadata database at the first metadata node; and
at least a second metadata node maintains a copy of the first partition and is configured to receive, from the first metadata node, updates to the first partition of the metadata database, and apply the updates to the copy of the first partition; and based on not receiving a response to the request sent to the first metadata node, and based on the partition mapping information indicating that the second metadata node maintains the copy of the first partition, sending, by the first computing device, to the second metadata node, the request for performing the database operation.

2. The system as recited in claim 1, the operation of receiving the partition mapping information further comprising:
sending to the second computing device a request for the partition mapping information;
receiving the partition mapping information from the second computing device in response to the request; and
storing the received partition mapping information on a computer-readable media of the first computing device.

3. The system as recited in claim 2, further comprising:
registering a request, at the second computing device, to receive an update to the partition mapping information at the first computing device in response to a change of the partition mapping information at the second computing device;
receiving, at the first computing device, the update to the partition mapping information; and
updating, by the first computing device, the partition mapping information stored on the computer-readable media of the first computing device based on the received update.

4. The system as recited in claim 1, wherein the second metadata node replaces the first metadata node as the leader node, configuring the second metadata node to respond to metadata database access requests for accessing the first partition of the metadata database, the operations further comprising:
receiving, by the first computing device, in response to the request for the first metadata associated with the key information, an indication that the first metadata node will not respond to the request, wherein receiving the indication further comprises receiving notification that the second metadata node is now the leader node configured to respond to metadata database requests for the first partition; and
sending, by the first computing device, the request for the first metadata associated with the key information to the second metadata node based on the notification that the second metadata node is now the leader node.

5. The system as recited in claim 1, wherein:
the first metadata node is configured to send a message periodically to the second metadata node and at least one other metadata node that also maintains a copy of the first partition of the metadata database; and
following a failure of the first node to send the message for a threshold period of time, second metadata node replaces the first metadata node as the leader node based on consensus from the at least one other node, wherein the second metadata node is configured to respond to metadata database access requests for accessing the first partition of the metadata database.

6. The system as recited in claim 1, wherein determining, by the first computing device, to perform a database operation with respect to the metadata database for first metadata is in response to receiving at least one of:
a request from a user device via a user web application; or
a request from an administrator device via a user web application.

7. The system as recited in claim 1, wherein determining, by the first computing device, to perform a database operation with respect to the metadata database for first metadata is in response to operation of an asynchronous management program to perform one or more asynchronous storage-related operations determined from an update queue.

8. The system as recited in claim 1, wherein the first computing device stores at least a portion of the partition mapping information as a key-space-tree data structure, the operation of accessing the partition mapping information to determine the first metadata node of the plurality of metadata nodes further comprising traversing the key-space-tree data structure to determine the first partition corresponding to the key information.

9. The system as recited in claim 1, further comprising based on receiving a response from the first metadata node, sending metadata information to another computing device to obtain data over a network from a remote storage system.

10. A method comprising:
receiving, by a first computing device, from a second computing device, partition mapping information indicating partitions of a metadata database, wherein the first computing device is able to communicate with a plurality of metadata nodes, each metadata node maintaining a portion of a metadata database based on partitioning of the metadata database to distribute the metadata database across the plurality of metadata nodes;
determining, by the first computing device, to send a request to the metadata database based at least on key information;
determining, by the first computing device, based on the partition mapping information, a first metadata node of the plurality of metadata nodes indicated to maintain a partition of the metadata database corresponding to the key information;
sending, by the first computing device, to the first metadata node, based on the partition mapping information, a request to perform a database operation, wherein:
partitioning of the metadata database to distribute the metadata database across the plurality of metadata nodes comprises assigning the first partition of the metadata database to a plurality of the metadata nodes;
the first metadata node is a leader node configured to respond to metadata database requests based on maintaining the first partition of the metadata database at the first metadata node; and
at least a second metadata node maintains a copy of the first partition and is configured to receive, from the first metadata node, updates to the first partition of the metadata database, and apply the updates to the copy of the first partition; and
based on not receiving a response to the request sent to the first metadata node, and based on the partition mapping information indicating that the second metadata node maintains the copy of the first partition, sending, by the first computing device, to the second metadata node, the request for performing the database operation.

11. The method as recited in claim 10, further comprising:
sending to the second computing device a request for the partition mapping information;
receiving the partition mapping information from the second computing device in response to the request;
storing the received partition mapping information on a computer-readable media of the first computing device;

registering a request, at the second computing device, to receive an update to the partition mapping information at the first computing device in response to a change of the partition mapping information at the second computing device;

receiving, at the first computing device, the update to the partition mapping information; and updating, by the first computing device, the partition mapping information stored on the computer-readable media of the first computing device based on the received update.

12. The method as recited in claim 10, wherein the second metadata node replaces the first metadata node as the leader node, configuring the second metadata node to respond to metadata database access requests for accessing the first partition of the metadata database, the method further comprising:

receiving, by the first computing device, in response to the request for the first metadata associated with the key information, an indication that the first metadata node will not respond to the request, wherein receiving the indication further comprises receiving notification that the second metadata node is now the leader node configured to respond to metadata database requests for the first partition; and sending, by the first computing device, the request for the first metadata associated with the key information to the second metadata node based on the notification that the second metadata node is now the leader node.

13. The method as recited in claim 10, wherein:

the first metadata node is configured to send a message periodically to the second metadata node and at least one other metadata node that also maintains a copy of the first partition of the metadata database; and following a failure of the first node to send the message for a threshold period of time, second metadata node replaces the first metadata node as the leader node based on consensus from the at least one other node, wherein the second metadata node is configured to respond to metadata database access requests for accessing the first partition of the metadata database.

14. The method as recited in claim 10, wherein the first computing device stores at least a portion of the partition mapping information as a key-space-tree data structure, the operation of accessing the partition mapping information to determine the first metadata node of the plurality of metadata nodes further comprising traversing the key-space-tree data structure to determine the first partition corresponding to the key information.

15. The method as recited in claim 10, further comprising based on receiving a response from the first metadata node, sending metadata information to another computing device to obtain data over a network from a remote storage system.

16. One or more non-transitory computer-readable media storing instructions that, when executed by one or more processors, configure the one or more processors to perform operations comprising:

receiving, by a first computing device, from a second computing device, partition mapping information indicating partitions of a metadata database, wherein the first computing device is able to communicate with a plurality of metadata nodes, each metadata node maintaining a portion of a metadata database based on partitioning of the metadata database to distribute the metadata database across the plurality of metadata nodes;

determining, by the first computing device, to send a request to the metadata database based at least on key information;

determining, by the first computing device, based on the partition mapping information, a first metadata node of the plurality of metadata nodes indicated to maintain a partition of the metadata database corresponding to the key information;

sending, by the first computing device, to the first metadata node, based on the partition mapping information, a request to perform a database operation, wherein:

partitioning of the metadata database to distribute the metadata database across the plurality of metadata nodes comprises assigning the first partition of the metadata database to a plurality of the metadata nodes;

the first metadata node is a leader node configured to respond to metadata database requests based on maintaining the first partition of the metadata database at the first metadata node; and at least a second metadata node maintains a copy of the first partition and is configured to receive, from the first metadata node, updates to the first partition of the metadata database, and apply the updates to the copy of the first partition; and based on not receiving a response to the request sent to the first metadata node, and based on the partition mapping information indicating that the second metadata node maintains the copy of the first partition, sending, by the first computing device, to the second metadata node, the request for performing the database operation.

17. The one or more non-transitory computer-readable media as recited in claim 16, the operations further comprising:

sending to the second computing device a request for the partition mapping information;

receiving the partition mapping information from the second computing device in response to the request;

storing the received partition mapping information on a computer-readable media of the first computing device;

registering a request, at the second computing device, to receive an update to the partition mapping information at the first computing device in response to a change of the partition mapping information at the second computing device;

receiving, at the first computing device, the update to the partition mapping information; and updating, by the first computing device, the partition mapping information stored on the computer-readable media of the first computing device based on the received update.

18. The one or more non-transitory computer-readable media as recited in claim 16, wherein the second metadata node replaces the first metadata node as the leader node, configuring the second metadata node to respond to metadata database access requests for accessing the first partition of the metadata database, the operations further comprising:

receiving, by the first computing device, in response to the request for the first metadata associated with the key information, an indication that the first metadata node will not respond to the request, wherein receiving the indication further comprises receiving notification that the second metadata node is now the leader node configured to respond to metadata database requests for the first partition; and sending, by the first computing device, the request for the first metadata associated with the key information to the second metadata node based on the notification that the second metadata node is now the leader node.

19. The one or more non-transitory computer-readable media as recited in claim 16, wherein:
the first metadata node is configured to send a message periodically to the second metadata node and at least one other metadata node that also maintains a copy of the first partition of the metadata database; and
following a failure of the first node to send the message for a threshold period of time, second metadata node replaces the first metadata node as the leader node based on consensus from the at least one other node, wherein the second metadata node is configured to respond to metadata database access requests for accessing the first partition of the metadata database.

20. The one or more non-transitory computer-readable media as recited in claim 16, the operations further comprising based on receiving a response from the first metadata node, sending metadata information to another computing device to obtain data over a network from a remote storage system.

\* \* \* \* \*